US012331916B1

(12) United States Patent
Chen

(10) Patent No.: US 12,331,916 B1
(45) Date of Patent: Jun. 17, 2025

(54) CIRCUIT BOARD POWER CONNECTION FOR LED LIGHT STRIPS

(71) Applicant: Sikai Chen, Delran, NJ (US)

(72) Inventor: Sikai Chen, Delran, NJ (US)

( * ) Notice: Subject to any disclaimer, the term of this patent is extended or adjusted under 35 U.S.C. 154(b) by 0 days.

(21) Appl. No.: 18/909,216

(22) Filed: Oct. 8, 2024

(51) Int. Cl.

| | |
|---|---|
| ***F21V 23/06*** | (2006.01) |
| ***F21S 4/20*** | (2016.01) |
| ***F21V 19/00*** | (2006.01) |
| ***F21V 31/00*** | (2006.01) |
| ***F21Y 103/10*** | (2016.01) |
| ***F21Y 113/00*** | (2016.01) |
| ***F21Y 115/10*** | (2016.01) |

(52) U.S. Cl.
CPC ................ *F21V 23/06* (2013.01); *F21S 4/20* (2016.01); *F21V 19/0015* (2013.01); *F21V 31/005* (2013.01); *F21Y 2103/10* (2016.08); *F21Y 2113/00* (2013.01); *F21Y 2115/10* (2016.08)

(58) Field of Classification Search
CPC ........ F21S 4/20-28; F21V 19/001-005; F21V 23/06; F21V 31/005; F21Y 2103/10; F21Y 2113/00; F21Y 2115/10
See application file for complete search history.

(56) References Cited

U.S. PATENT DOCUMENTS 8,979,307 B2 * 3/2015 Ishibashi .................. F21S 4/26 362/249.02
11,499,703 B1 * 11/2022 Smith .................. F21V 23/004
11,692,698 B1 * 7/2023 Chen ......................... F21S 4/10 362/225
2003/0112627 A1 * 6/2003 Deese ................ F21V 21/0832 362/800

* cited by examiner

*Primary Examiner* — Jason M Han
(74) *Attorney, Agent, or Firm* — Stuart M. Goldstein

(57) ABSTRACT

An electrical circuit board power connection interfaces with LED strip lighting. The LED strip lighting is equipped with an electric circuit board on which a plurality of LED elements and a plurality of sets of electrical power connection components are located at regular intervals. Each set of power components has a positive power component and a negative power component and each one of the plurality of LED elements is adjacently aligned with a different set of electrical power connection components. For high-voltage applications, components located on the LED strip can also connect to a ground wire. For RGB products, each set of power connection components has positive, negative, and data components. The LED strip is encompassed by a waterproof enclosure for waterproof applications.

4 Claims, 18 Drawing Sheets

CIRCUIT BOARD POWER CONNECTION FOR LED LIGHT STRIPS

FIELD OF THE INVENTION

The present invention relates to LED strip lighting, specifically an improved design of the circuit board and power connection scheme that facilitates easy power access, especially in waterproof applications.

BACKGROUND OF THE INVENTION

Conventional LED strips are typically powered at both ends, where the electrical current flows from the power source through the wires and then to the LED strip circuit board, which conducts electricity to each LED. These strips often include solder pads every few LEDs to allow for easy cutting and re-soldering to access power. However, a significant drawback arises when these LED strips are used in waterproof applications, as accessing power through solder pads becomes difficult after waterproofing.

In addition, powering the LED strip at its ends restricts the location at which the LED strip receives its electricity from the power source. This often presents a logistical problem, especially if the power source is positioned at an inconvenient or inaccessible location in relation to the LED strip.

SUMMARY OF THE INVENTION

It is thus the object of the present invention to provide a system for a circuit board power connection which overcomes the limitations and disadvantages of prior LED light strip systems.

These and other objects are accomplished by the present invention, a novel electrical circuit board power connection scheme interfacing with LED strip lighting. The LED strip lighting is equipped with an electric circuit board on which a plurality of LED elements and a plurality of sets of electrical power connection components are located at regular intervals. Each set of power components has a positive power component and a negative power component and each one of the plurality of LED elements is adjacently aligned with a different set of electrical power connection components. For high-voltage applications, components located on the LED strip can also connect to a ground wire. For RGB products, each set of power connection components has positive, negative, and data components. The LED strip is encompassed by a waterproof enclosure for waterproof applications.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
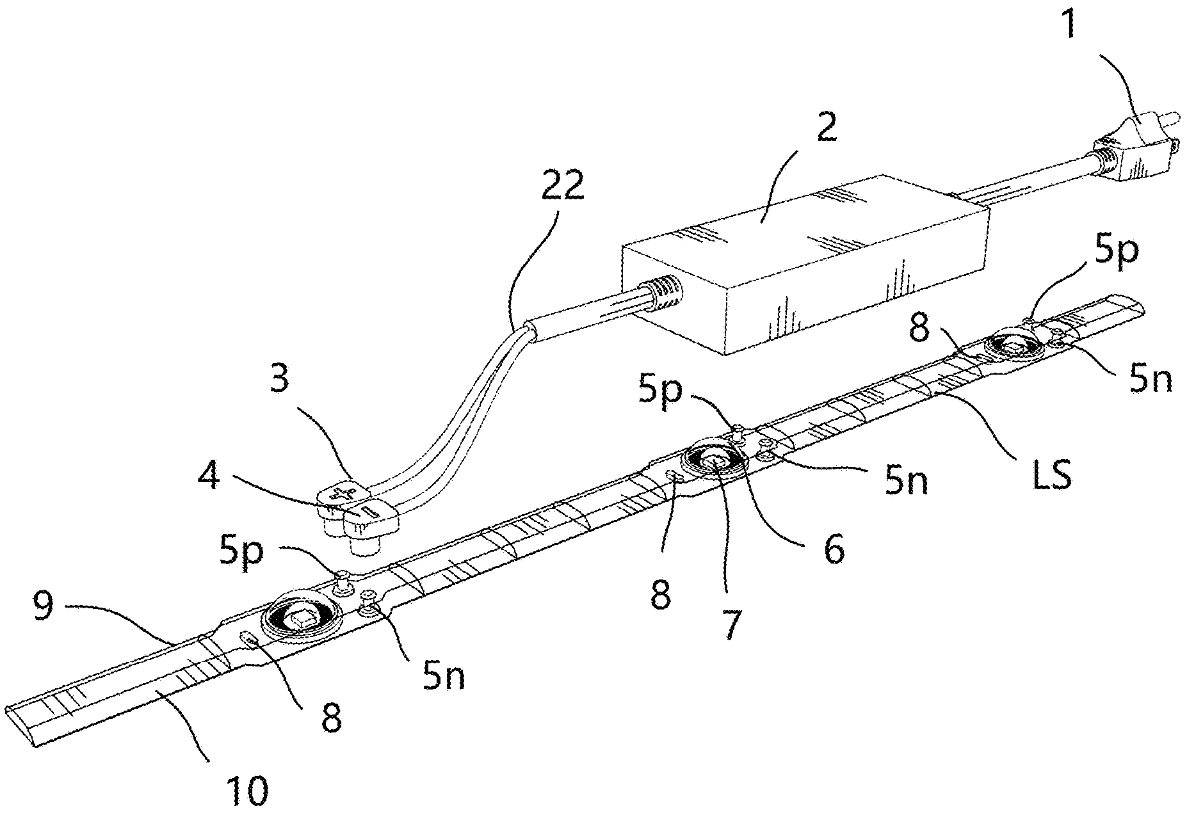
FIG. 1 shows the components of the present invention.
Figure 2:
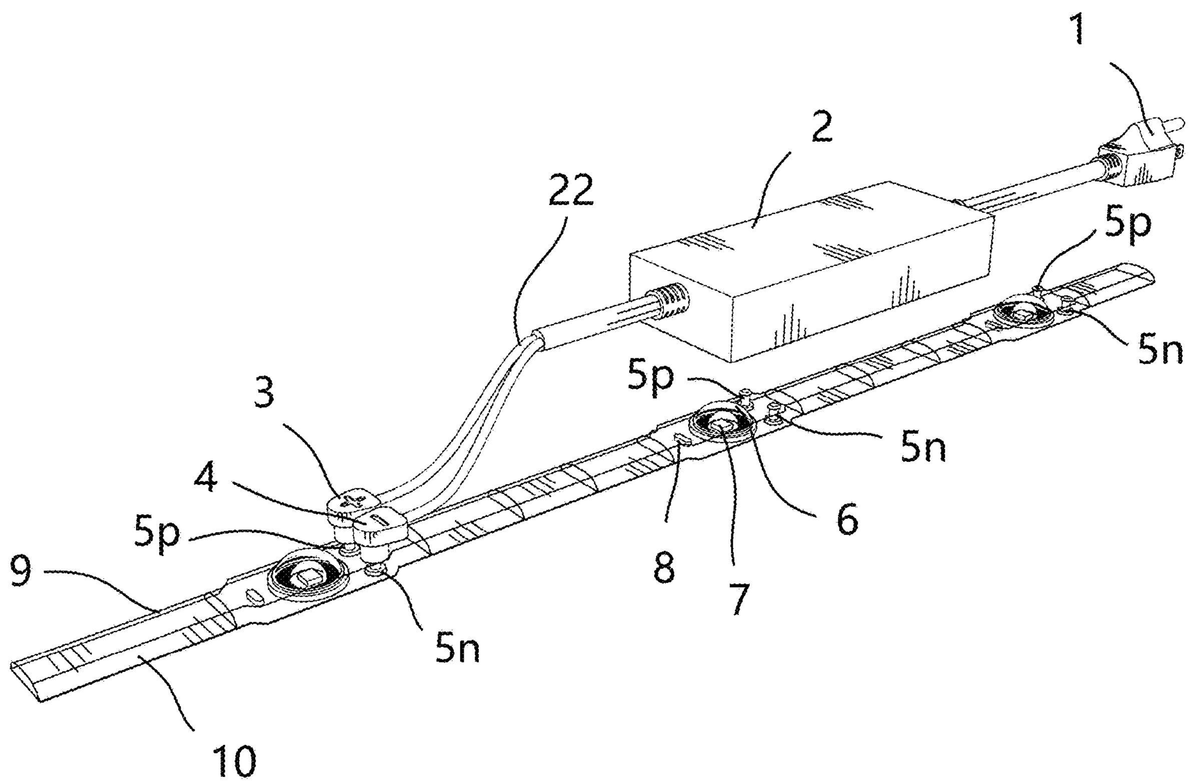
FIG. 2 shows the components of the present invention in operational mode.
Figure 3:
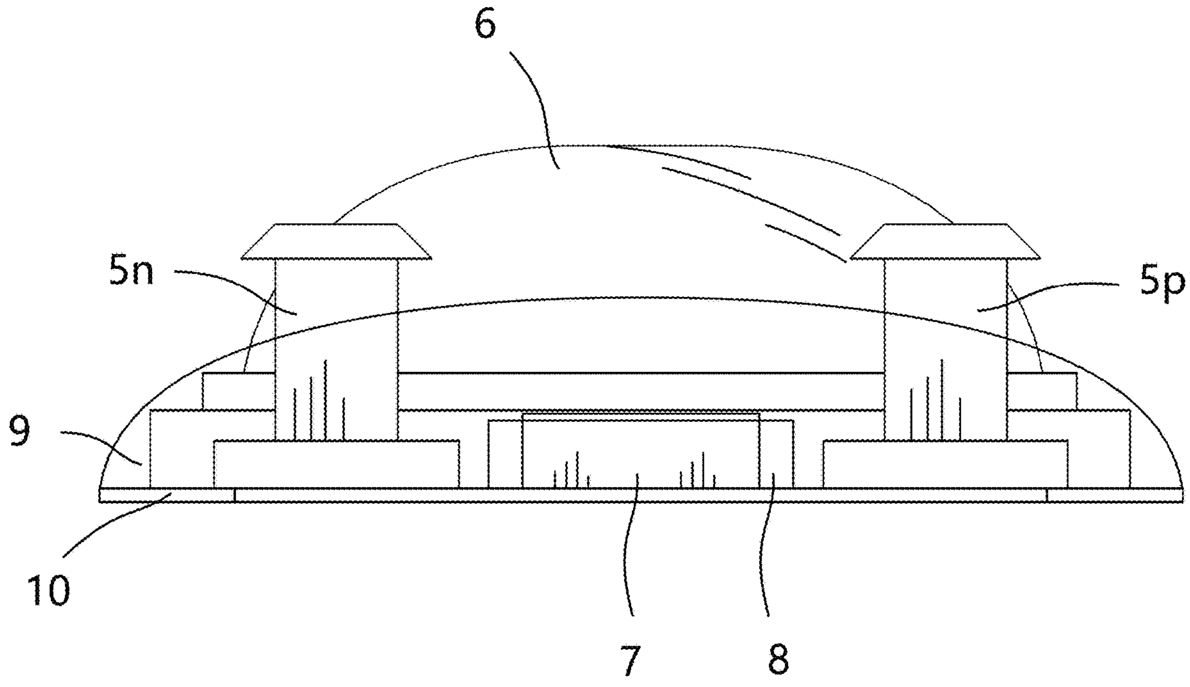
FIG. 3 is an end view of the components of the present invention.

The circuit board power connection of the present invention, as shown in FIGS. 1-3, has electrical circuit board 10 which interfaces with LED lights on light strip LS, conducting electricity to the LED lights, i.e. LED elements 7, encased by waterproofed sealed lenses 6. A plurality of sets of electrical power connection components are located at regular intervals on light strip LS. Each set of power connection components comprises negative power component **5*n* positioned on circuit board 10 and positive power connection component 5*p* also positioned on the circuit board. Each one of the LED lights, which include LED elements 7 and sealed lenses 6, is adjacently aligned with a different set of electrical power connection components. Power connection components 5*n* and 5*p* are pre-installed to connect with terminals of circuit board 10. Resistors 8** are located on power strip LS as well.

Positive power source connector 3 and negative power source connector 4 have electrical wiring 22 leading to electrical power source 2 which receives electricity via plug 1.

Waterproof enclosure 9, fabricated of water resistant material, encompasses light strip LS. In this manner, the light strip can be adapted for waterproof applications.

Thus, the system of the present invention provides for a fast and easy connection of the power connection components to the power source; since these components are positioned on the circuit board in such a way that they are readily accessible from any LED strip location, even after the light strip has undergone waterproofing via the waterproof enclosure. Advantageously, providing electricity to any single set of electrical power connections, i.e. a positive power connection **5*p* and a corresponding negative power connection 5*n*, will serve to light up multiple lamp elements 7**.

Figure 4:
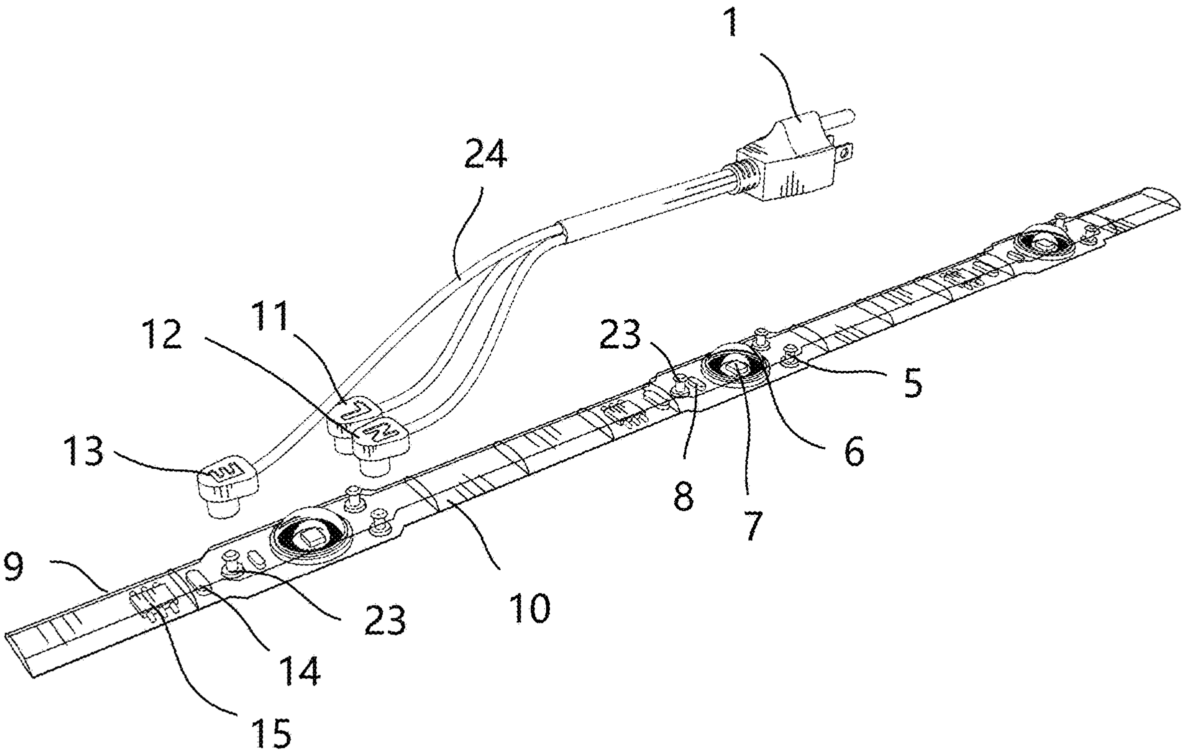
FIG. 4 shows the components of the present invention with ground line attachment.
Figure 5:
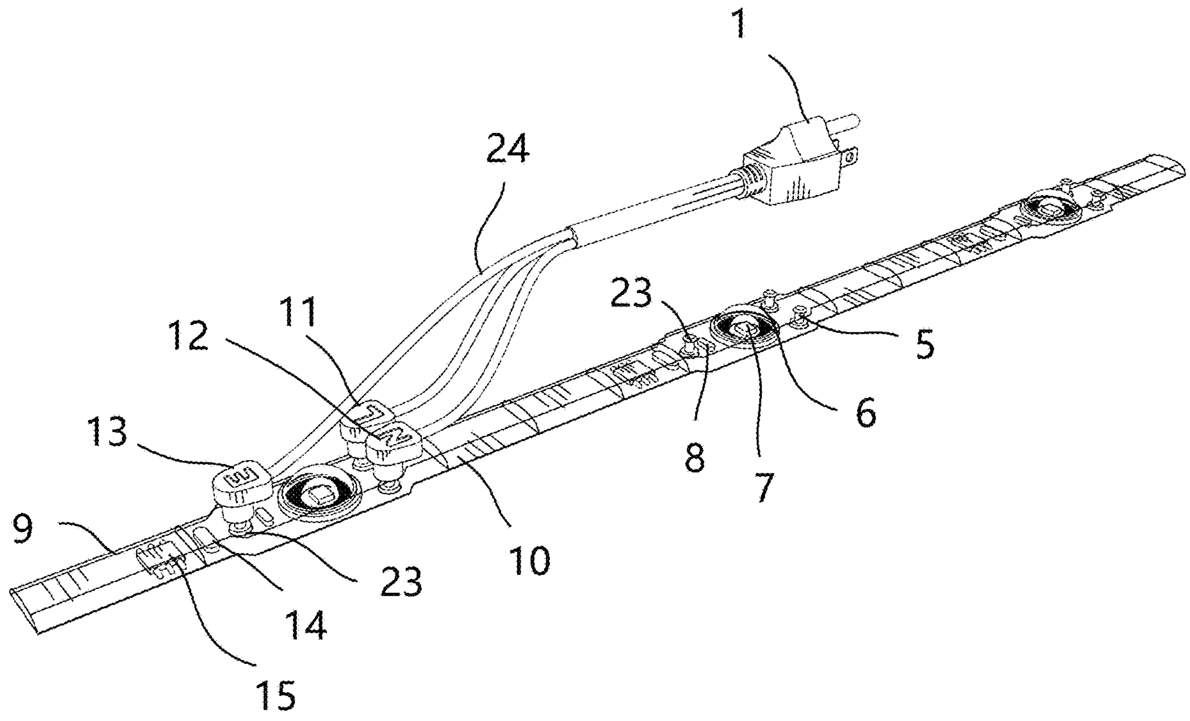
FIG. 5 shows the components in FIG. 4 in operational mode.
Figure 6:
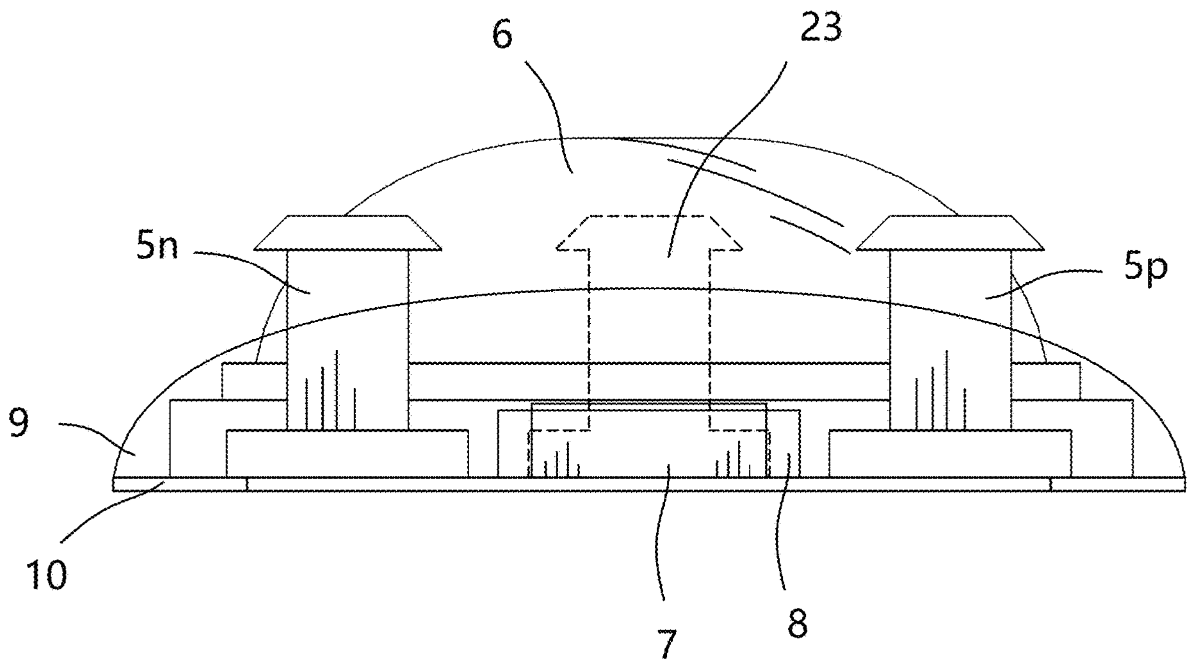
FIG. 6 is an end view of the components shown in FIG. 4.

FIGS. 4-6 show ground line components 23 positioned on circuit board 10, for high voltage use applications. Ground line connector 13 having ground wire 24 leading to power source 2, is configured to connect with one of the ground line components 23.

Figure 7:
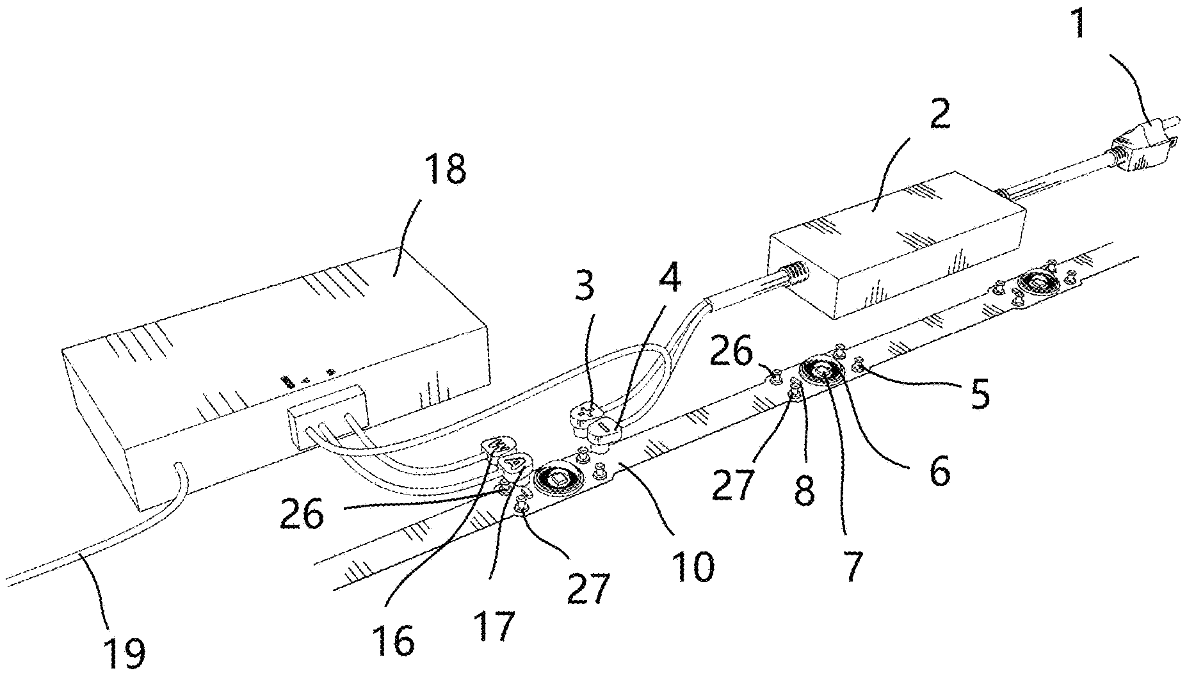
FIG. 7 shows the components of the present invention with data transmission components.
Figure 8:
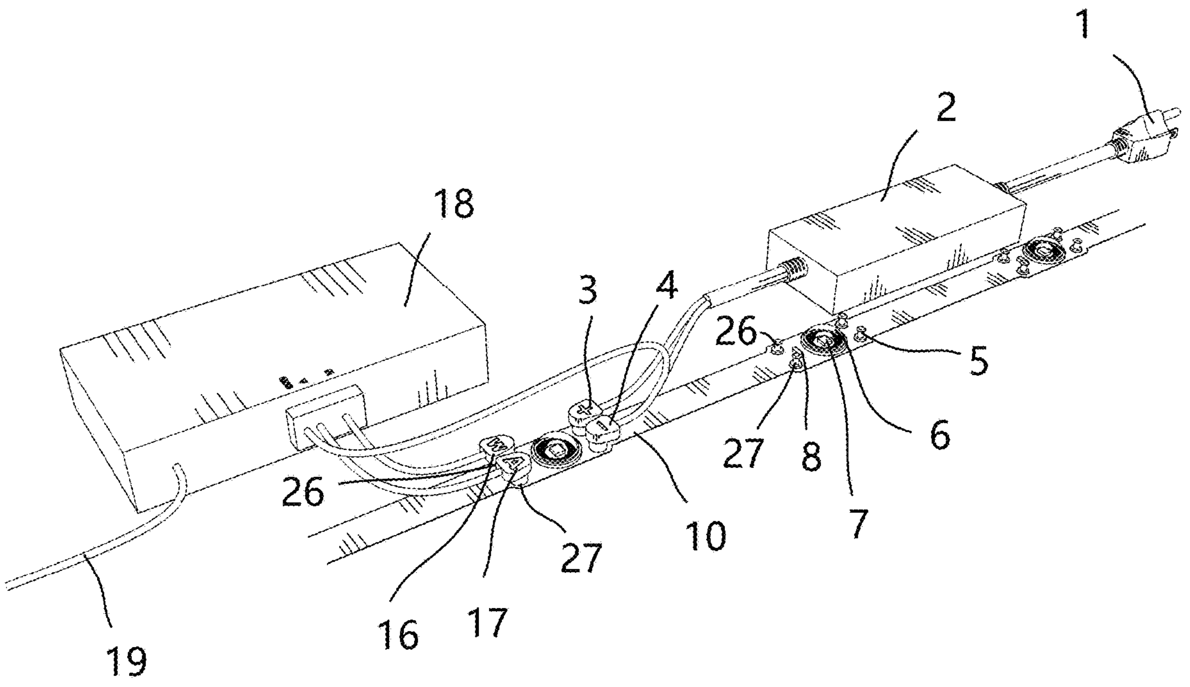
FIG. 8 shows the components in FIG. 7 in operational mode.
Figure 9:
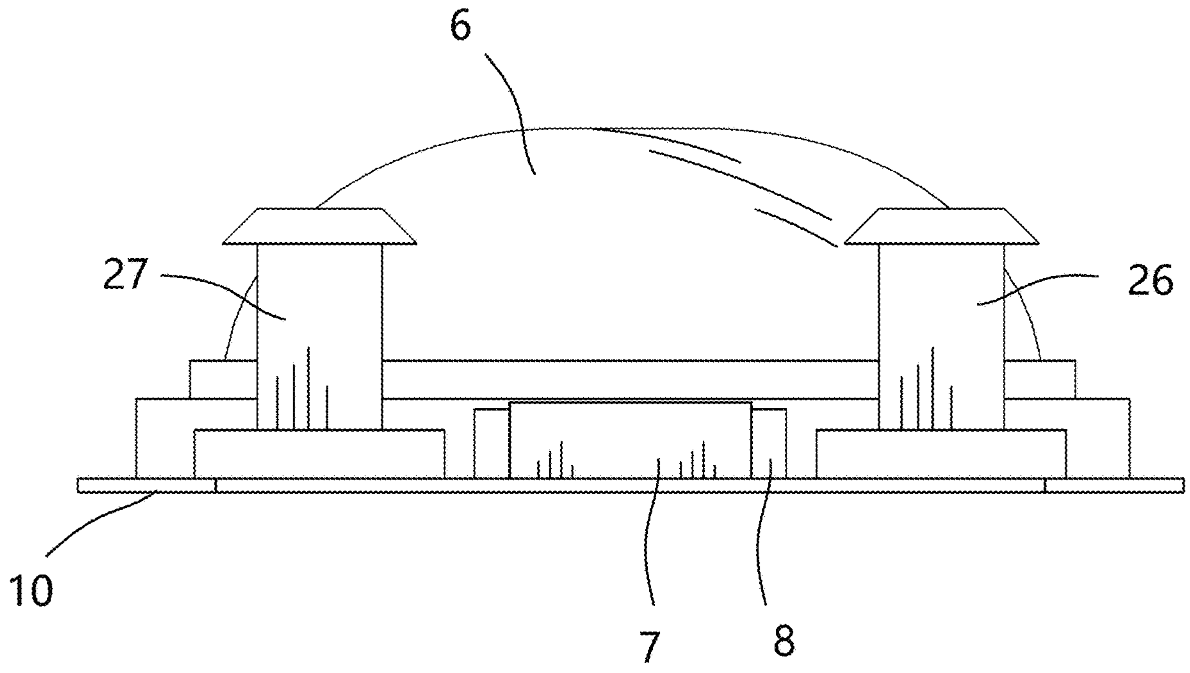
FIG. 9 is an end view of the components shown in FIG. 7.

FIGS. 7-9 show sets of informational data receiving components, each set comprising data components 26 and 27 positioned on circuit board 10. Controller 18, receiving electrical power from electrical line 19, sends information via data lines to data connectors 16, e.g. an address line connection, and 17, e.g. a data line connection, to data receiving components 26 and 27. Additional data can be sent from controller 18 via a data line to power source connector 4.

Figure 10:
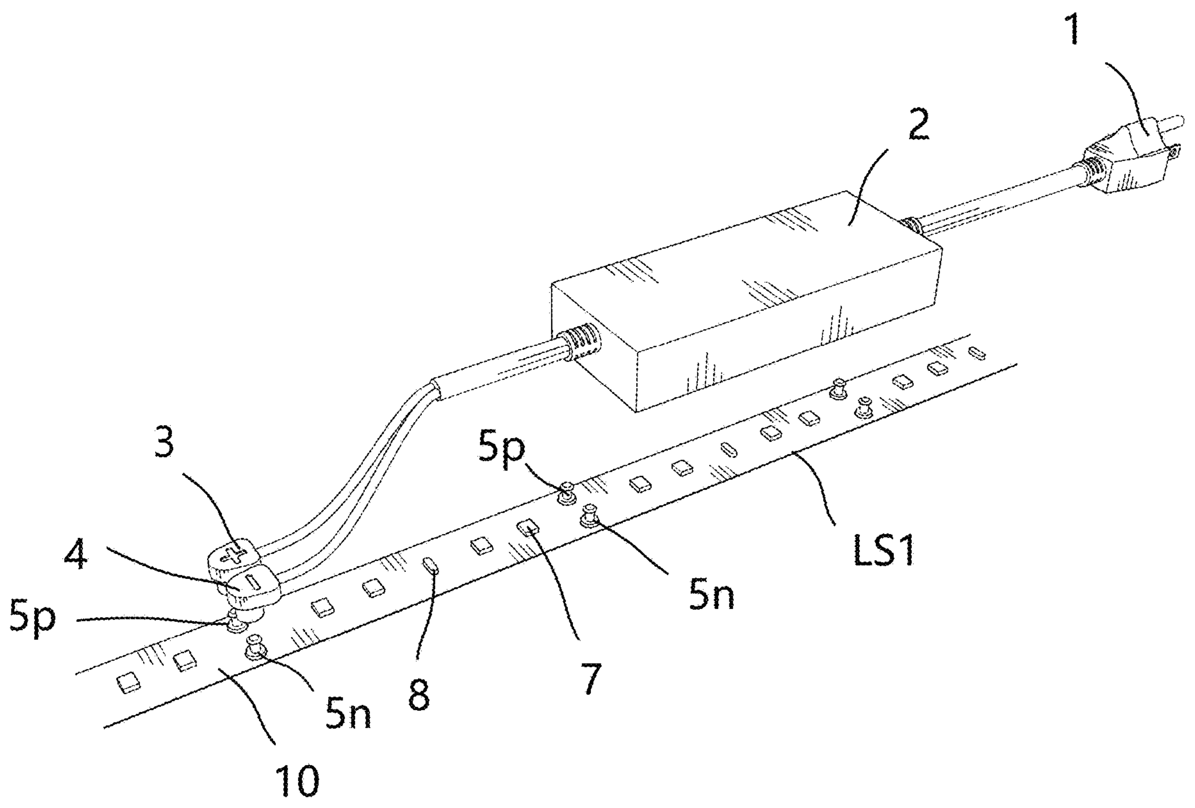
FIG. 10 shows the components of the present invention in use with an alternate light strip.
Figure 11:
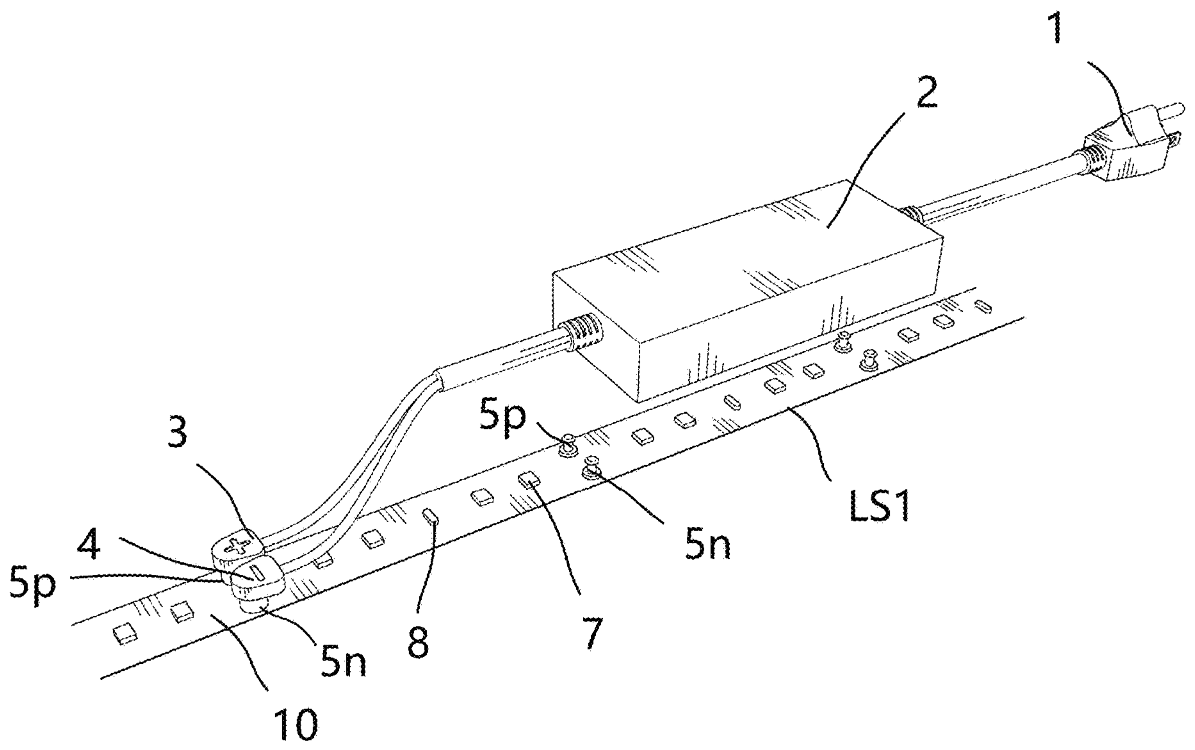
FIG. 11 shows the components in FIG. 10 in operational mode.
Figure 12:
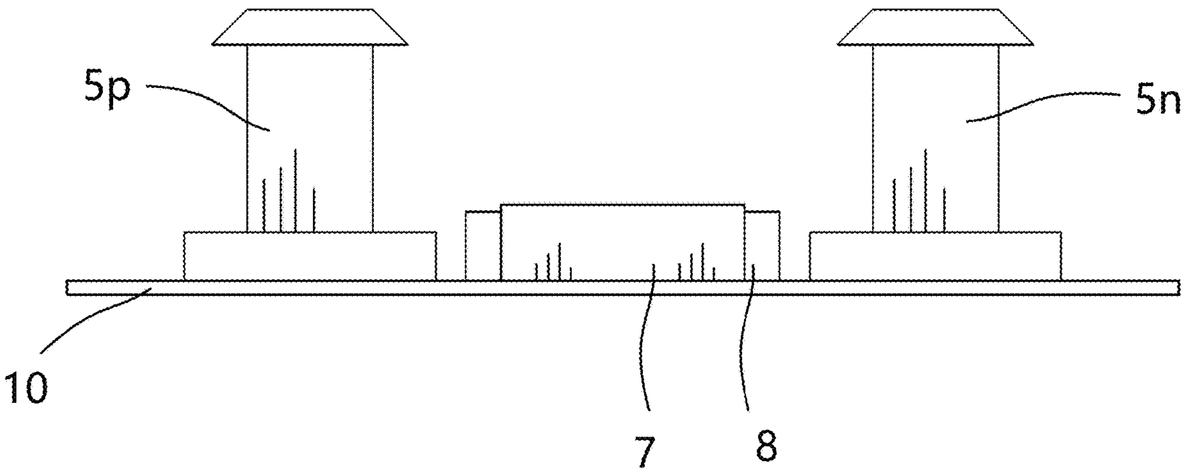
FIG. 12 is an end view of the components in FIG. 10.

FIGS. 10-12 show alternate light strip LS1 employing the features of the present invention.

Figure 13:
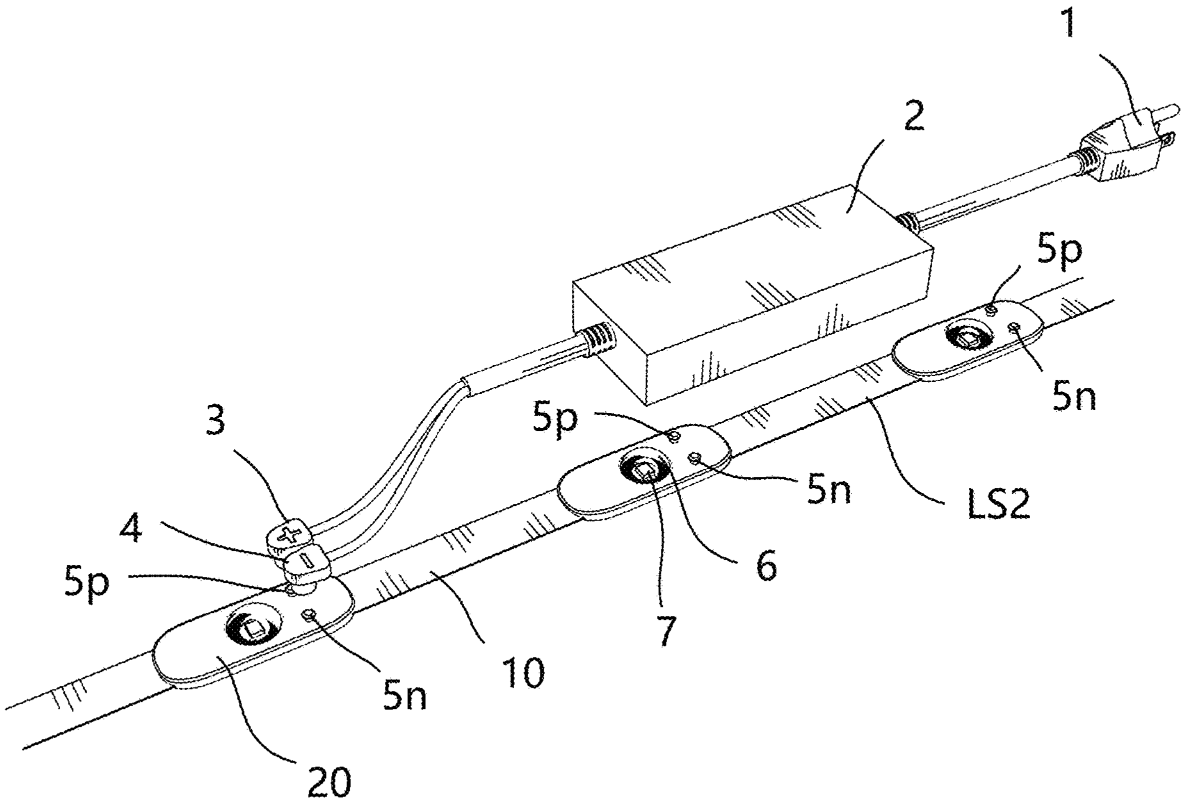
FIG. 13 shows the components of the present invention in use with still another alternate light strip.
Figure 14:
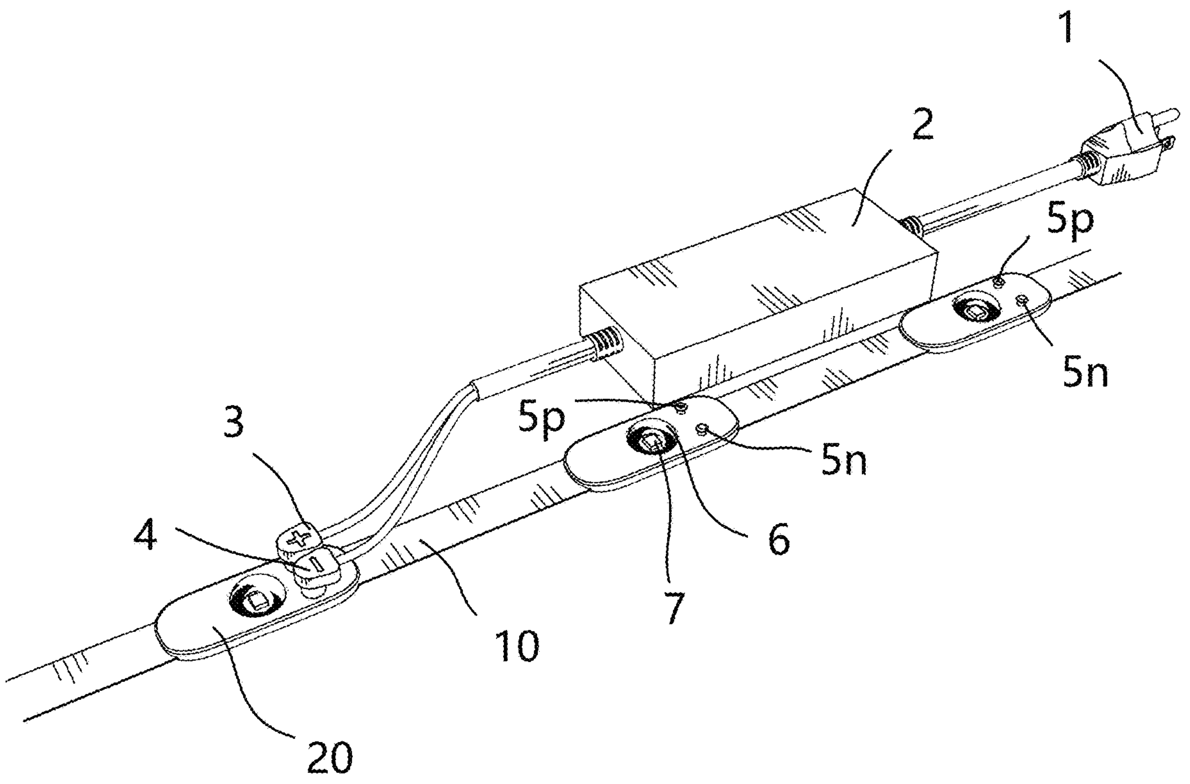
FIG. 14 shows the components in FIG. 13 in operational mode.
Figure 15:
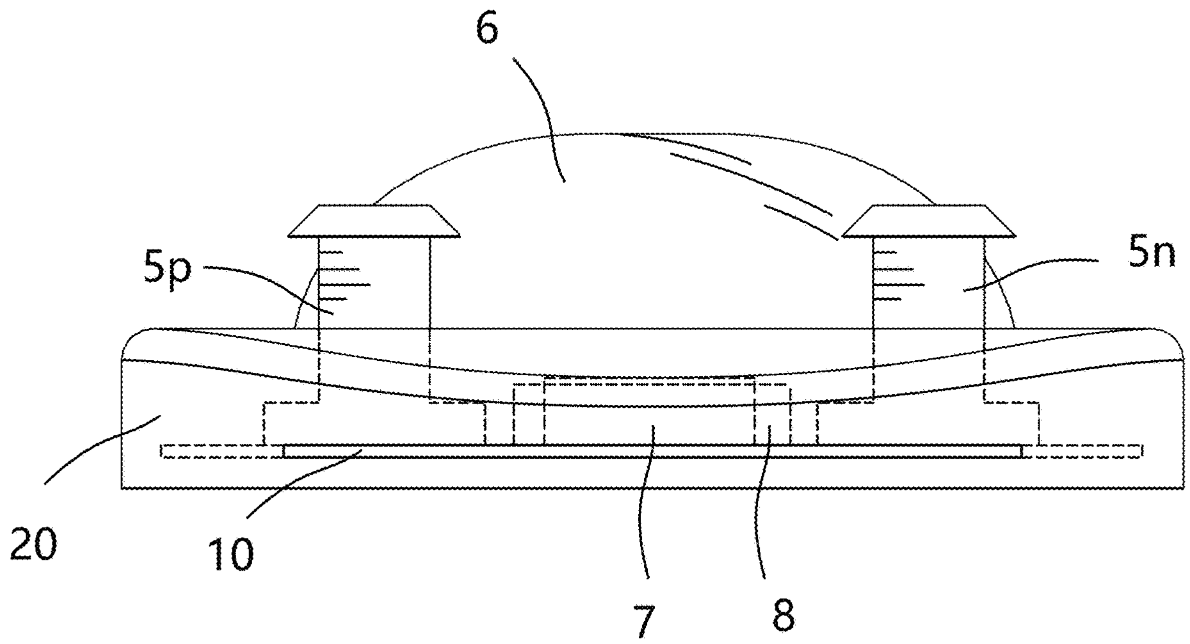
FIG. 15 is an end view of the components in FIG. 13.

FIGS. 13-15 show alternate light strip LS2 employing the features of the present invention, using PVC electrical connector 20, via power source connectors 3 and 4 to supply electrical power to circuit board 10 and hence LED elements 7.

Figure 16:
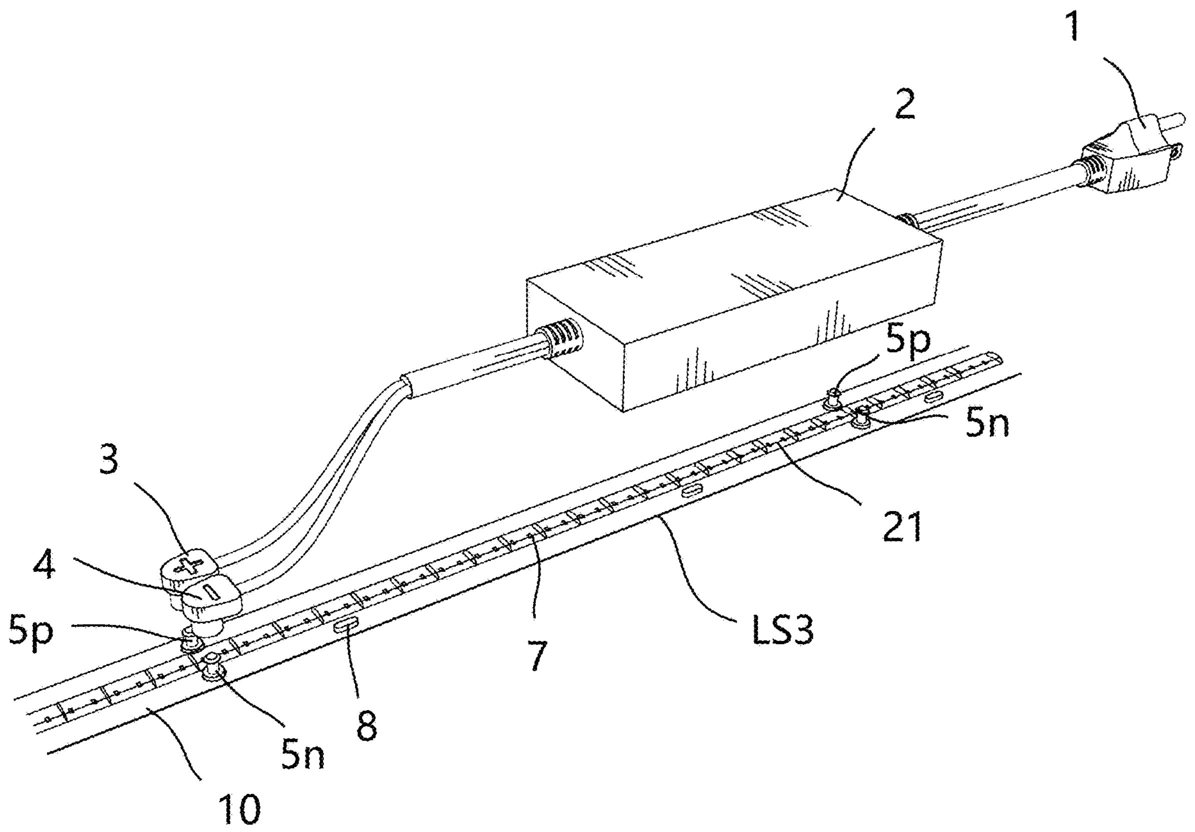
FIG. 16 shows the components of the present invention in use with another alternate light strip.
Figure 17:
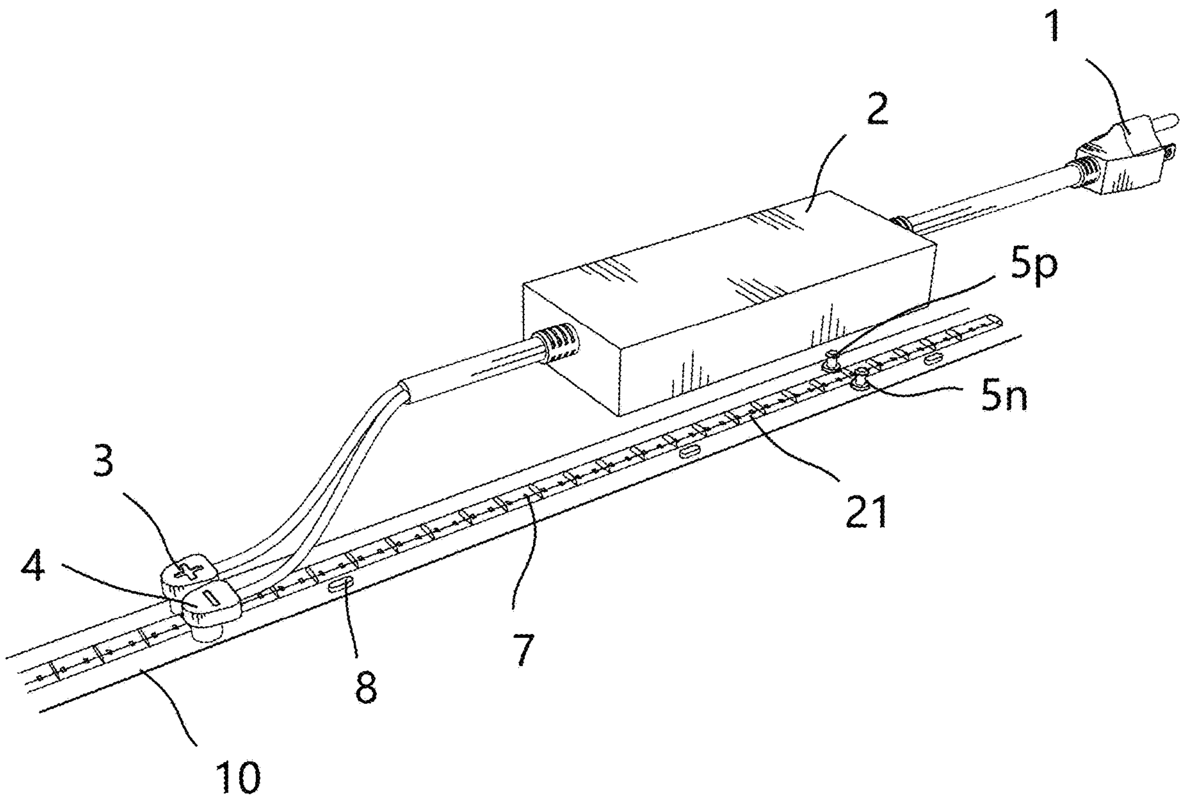
FIG. 17 shows the components in 16 in operational mode.
Figure 18:
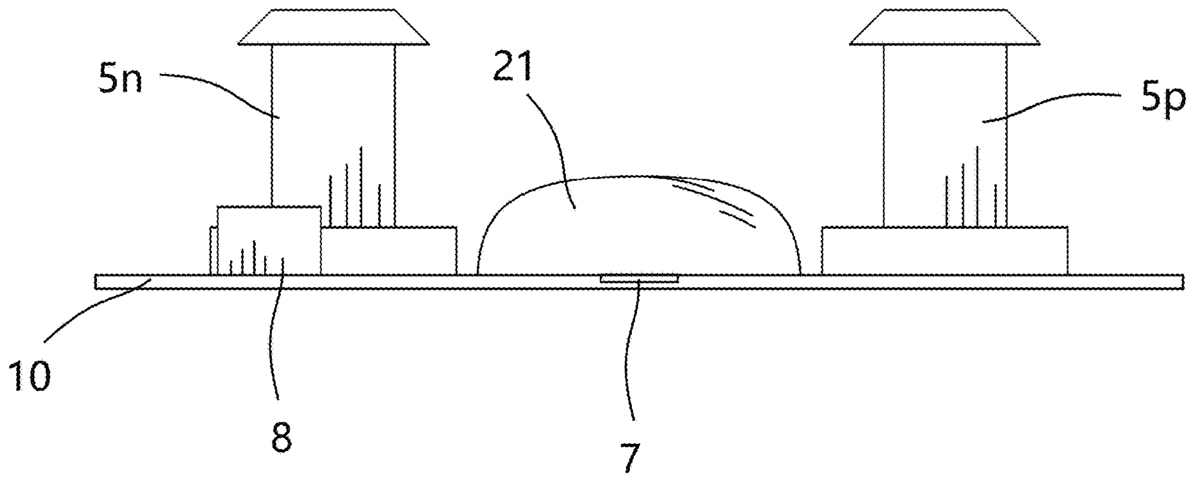
FIG. 18 is an end view of the components in FIG. 16.

FIGS. 16-18 show alternate light strip LS3 employing the features of the present invention, using COB gel 21, via power source connectors 3 and 4 to supply electrical power to circuit board 10 and hence LED elements 7.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A circuit board power connection for illuminating LED strip lighting comprising:

a circuit board electrically interfaced with a plurality of LED lights located on and extending along the circuit board;

a plurality of sets of electrical power connection components, each set of power connection components comprising at least one unitary, upstanding positive electrical power component positioned on and projecting upward from the circuit board and at least one unitary, upstanding negative electric power component positioned on and projecting up from the circuit board, each one of the plurality of LED lights being adjacently aligned with a different set of electrical power connection components; and a positive power source connector configured to be positioned over and on an upstanding positive power component and a negative power source connector configured to be positioned over and on an upstanding negative power source component, said positive and negative power source connectors leading to a power source, wherein upon positioning the positive power source connector over and on the positive power component of one of the plurality of sets of electrical power connection components and upon positioning the negative power source connector over and on the negative power component of said one of the plurality of sets of electrical power connection components, electrical power is transmitted from the power source, to the power source connectors, and through to the positive and negative power components in order to illuminate said plurality of LED lights.

2. The circuit board power connection as in claim 1 further comprising a waterproof enclosure encompassing the LED light strip.

3. The circuit board power connection as in claim 1 further comprising a plurality of ground line connection components positioned on the circuit board and a ground line power source connector having a ground wire leading to the power source, wherein upon attachment of the ground line power source connector to the any one of the plurality of ground line connection components, the power connection runs to ground.

4. The circuit board power connection as in claim 1 further comprising a plurality of sets of informational data receiving components positioned on the circuit board, wherein upon attachment of wiring from a data controller to any one of the plurality of sets of data receiving components, informational data is transmitted to the LED elements.

* * * * *